United States Patent
Davis

(10) Patent No.: US 6,404,424 B1
(45) Date of Patent: Jun. 11, 2002

(54) METHOD FOR CONSTRUCTING ARCHITECTURAL MODELS INCLUDING SCALED SURFACE TEXTURES

(75) Inventor: Steve Davis, Owasso, OK (US)

(73) Assignee: Punch Software, LLC, Kansas City, MO (US)

(*) Notice: Subject to any disclaimer, the term of this patent is extended or adjusted under 35 U.S.C. 154(b) by 0 days.

(21) Appl. No.: 09/324,219

(22) Filed: Jun. 2, 1999

(51) Int. Cl.[7] .............................................. G06F 17/00
(52) U.S. Cl. ......................... 345/418; 345/629; 700/182
(58) Field of Search ................................. 345/418, 419, 345/420, 421, 429, 430, 629, 630, 641, 664, 679, 582; 703/1; 706/10; 358/1.1

(56) References Cited

U.S. PATENT DOCUMENTS

| | | | | |
|---|---|---|---|---|
| 4,501,098 A | * | 2/1985 | Gregory | 52/79.1 |
| 4,546,434 A | | 10/1985 | Gioello | 364/300 |
| 4,640,529 A | | 2/1987 | Katz | 281/5 |
| 4,847,778 A | | 7/1989 | Daley | 364/474.22 |
| 5,345,391 A | * | 9/1994 | Hull et al. | 264/401 |
| 5,488,699 A | | 1/1996 | Hanson, Jr. | 395/119 |
| 5,495,568 A | | 2/1996 | Beavin | 395/161 |
| 5,689,435 A | | 11/1997 | Umney et al. | 364/512 |
| 5,740,051 A | | 4/1998 | Sanders, Jr. et al. | 364/468.26 |
| 6,018,625 A | * | 1/2000 | Hayball | 395/500.43 |
| 6,088,689 A | * | 7/2000 | Kohn | 706/10 |
| 6,333,749 B1 | * | 12/2001 | Reinhardt et al. | 345/629 |

FOREIGN PATENT DOCUMENTS

| | | | | |
|---|---|---|---|---|
| JP | 410152936 | * | 6/1998 | E04B/9/30 |
| JP | 10205136 | * | 8/1998 | E04G/21/14 |
| JP | 411013201 | * | 1/1999 | E04C/2/04 |
| JP | 11224045 | * | 8/1999 | G09B/25/04 |

* cited by examiner

Primary Examiner—Matthew Luu
Assistant Examiner—Wesner Sajons
(74) Attorney, Agent, or Firm—Hovey Williams LLP

(57) ABSTRACT

A method of creating architectural models that includes scaled surface textures for at least one exterior surface of the architectural design is provided. The method includes printing scaled templates for component parts of an architectural model and a set of building instructions for the architectural model using a computer-aided design system. Once the scaled templates for the component parts are printed, they are trimmed and affixed to a suitable model-making material, such as foamboard, after which the model-making material is trimmed to correspond to the shape of each template. The component parts are assembled and a plurality of template texture overlays are printed, which correspond to the desired surface textures and colors of the component parts forming the model. The scaled template texture overlays are permanently affixed to the component parts.

11 Claims, 8 Drawing Sheets

METHOD FOR CONSTRUCTING ARCHITECTURAL MODELS INCLUDING SCALED SURFACE TEXTURES

FIELD OF THE INVENTION

This invention relates to a method for constructing architectural models. More specifically, the invention is directed to an architectural model making method, which results in the construction of three-dimensional architectural models including scaled surface textures on at least the exterior surfaces thereof.

BACKGROUND OF THE INVENTION

In the construction industry, it is often desirable to reduce an architectural design to a physical model of the structure so that it can be presented to a client for consideration, modification or approval. Generally speaking, architectural models are prepared early in the design process before detailed structural analyses are performed. Nonetheless, architectural models are a critical step in the building design process, since they allow a client to visualize a completed design via a physical, tangible structure.

Basic architectural models have been made for years by architects and the like in order to present their designs to clients. Typically, an architect would prepare a set of rough plans for a structure and then transfer scaled dimensions from the rough set of plans to a suitable model-making material, such as cardboard or foamboard. This would require the architect to draw the outlines of various components parts of the structure onto the construction material, which would require measuring and manual scaling of the parts, cut out the various component parts and then assemble them into a finished model using tape and glue according to the rough set of architectural plans. While this process provides a suitable structure from which a client can perceive a completed design, it is time consuming and sometimes cost-prohibitive. It often also fails to provide visual information related to the exterior surface textures of the various component parts of the structure.

In order to provide such information, an architect or building designer would need to utilize his or her artistic skills in coloring each component part to achieve a desired exterior surface effect.

In the recent past, the proliferation of computer aided design systems and programs has greatly enhanced the architectural design process using available systems and software, an architect can readily design a structure and quickly prepare, a computer-generated rendering of the finished structure. While computer-generated renderings can be viewed from many angles and can include surface textures that can be readily interchanged, current technology dictates that they must be displayed on a computer display screen and that a computer system including an appropriate computer aided design software package is available in order to reproduce them. Thus, while they can provide an architect with the ability to present an initial design to a client at the architect's office, computer-generated renderings can not replace the use of architectural models, which can be delivered to a client and studied by the client over time at his or her home or office.

Accordingly, there still exists a need for an architectural model making system and method, which takes advantage of the abilities of computer aided design systems and software packages to produce scaled, architectural models of buildings including scaled surface textures of at least the exterior portions thereof.

SUMMARY OF THE INVENTION

The present invention satisfies this need by providing a method of creating architectural models that includes providing a computer-aided design system including a processor, at least one input device, a visual display device; and an output printer for generating a complete architectural design, including surface textures for at least one exterior surface of the architectural design. The method includes printing scaled templates for component parts of an architectural model and a set of building instructions for the architectural model using the computer-aided design system. Once the scaled templates for the component parts are printed, they are trimmed to the size marked on the templates and are affixed to a suitable model-making material, such as foamboard, after which the model-making material is trimmed to correspond to the shape of each template. Once the component parts are cut to shape, a plurality of template texture overlays are printed, which correspond to the desired surfaces of the component parts. These scaled template texture overlays are then permanently affixed to the component parts.

The component parts are assembled according to the building instructions to create the completed three-dimensional architectural model. In the preferred embodiment, a color printer is utilized to allow for the creation of photo-realistic, colored texture overlays.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
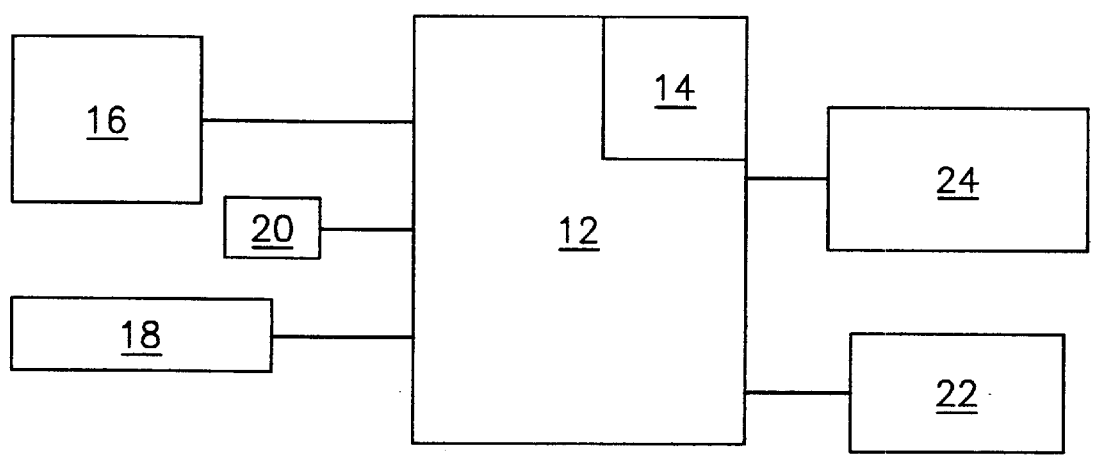
FIG. 1 is a schematic block diagram of the components of a computer-aided design system used for the disclosed architectural model-making method.

Turning now to the figures and, in particular, FIG. 1, a computer-aided design system, such as are well known to those skilled in the art, is shown. The computer-aided design system 10 includes a CPU 12 for processing design information, memory 14 for storing design information, including a plurality of surface textures and colors and a number of peripheral components. The peripheral components include display unit 16, input devices, such as keyboard 18 and mouse 20 as well as output devices, such as printer 22 and plotter 24. These system components are common amongst the majority of computer-aided design systems and allow an architect or designer to prepare detailed designs for structures to be constructed.

Figure 2:
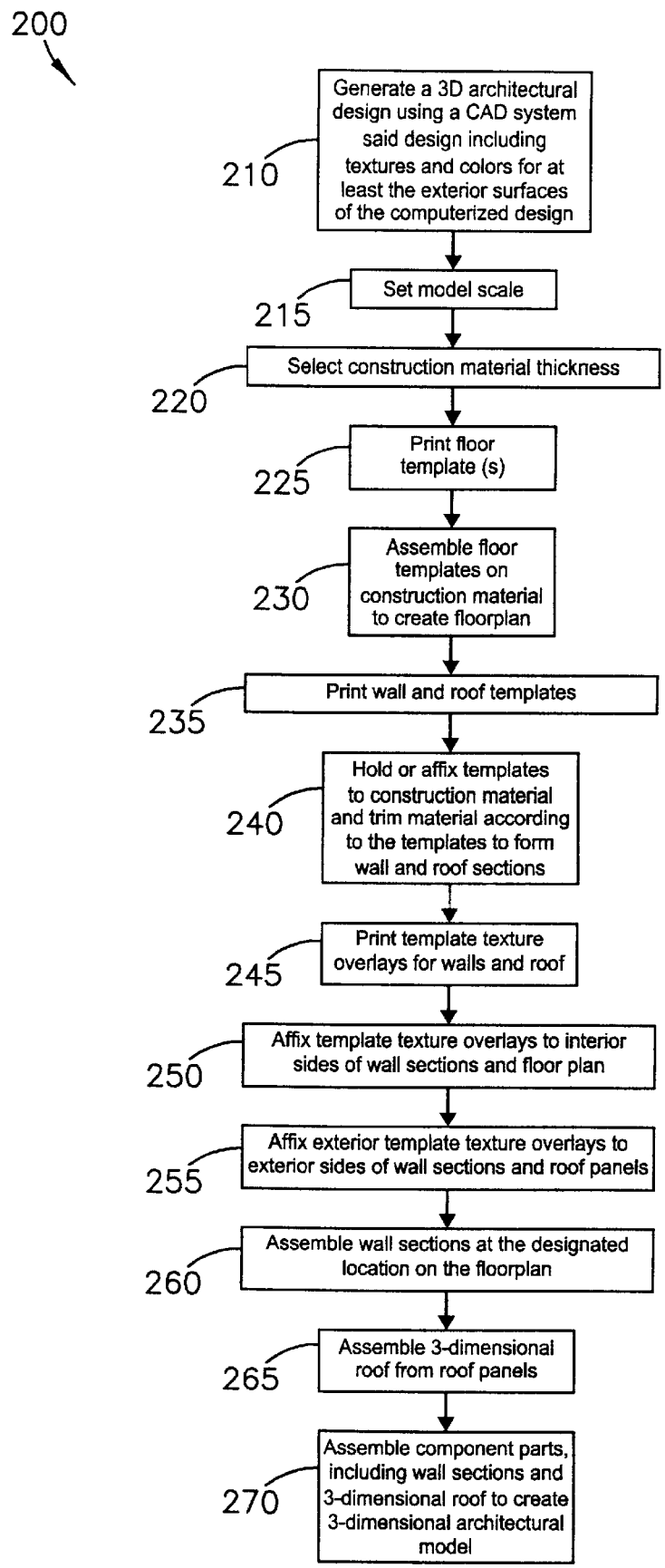
FIG. 2 is a flow diagram of the steps included in a three-dimensional architectural model-making method according to the present invention.

It is in conjunction with these, well known, computer-aided design systems that the disclosed method of creating three-dimensional architectural models operates. As shown in FIG. 2, a method 200 for creating three-dimensional architectural models according to the present invention is shown.

Method 200 begins with the creation of an architectural design (preferably a 3D design) using a computer-aided design system, step 210. In one preferred embodiment, the generated architectural design includes surface textures and colors of at least the exterior surfaces of the walls and roof of the design. In another embodiment, both interior and exterior wall surface colors and textures are provided. In yet another embodiment, floor and ceiling textures may also be provided.

Once the architectural design is completed, the designer who wishes to create a three-dimensional architectural model of the design must set a model scale, step 215. Once the model scale is selected, the model maker must then inform the system of the thickness of the construction material that will be utilized for the model, step 220. The model maker is thereafter ready to begin the creation of the actual model.

The first step in the actual model-making process is to print out at least one floor template, step 225. Then, the floor template or templates are assembled on the chosen construction material to create a floorplan for the architectural model, step 230. Floor templates may be prepared for the first, second, third or subsequent floors of the structure.

Once the floor panels are prepared, the next step is to print all wall and roof templates for the design, step 235. Next, the model maker will use the wall templates as a guide to assist him or her in cutting out panels of construction material to the size of the templates, step 240. This may be accomplished by either temporarily or permanently holding, gluing or otherwise affixing the wall templates to the construction material. If gluing is utilized, then a permanent glue should be utilized since the wall templates will become an integral part of the completed architectural model.

Once the floor, wall, and roof panels are prepared, the next step in creating the three-dimensional architectural model is to print and trim template texture overlays for the various panels, step 245. These texture overlays include textures and colors for the various building materials selected. For example, a desired shade of exterior brick work may be selected or a specific clapboard or shake spacing may be desired. Additionally, various roofing materials may be selected in a variety of colors.

In a more sophisticated embodiment of the invention, interior texture overlays may be printed as well. Interior texture overlays could provide an architectural model with realistic interior features, such as hardwood floors, carpeting, and a variety of colors for interior wall panels. Texture overlays could also provide wallpaper effects for interior walls if desired. The actual materials, colors and textures are selected when the architectural design is created using the computer-aided design package.

Once all the template texture overlays are printed and trimmed to size, if interior texture overlays are to be utilized in the specific model being constructed, then the interior template texture overlays must be affixed to the interior surfaces of the appropriate model panels, including walls, floors and ceilings, step 250. Preferably, the template texture overlays are glued to the interior surfaces of the appropriate model panels using a permanent glue. The template texture overlays for all of the exterior surfaces of the model are affixed, using glue or the like, to the appropriate sections of the constructed model, step 255.

At this point, the wall panels should be assembled, step 260. The wall panels may be assembled together prior to affixing them to the floor plan or, they may be partially assembled at this stage to facilitate the application of texture overlays to the interior surfaces thereof, which will be discussed below.

The roof panels are then either partially or completely assembled, step 265, to produce a three-dimensional roof according to the architectural design.

Then, in step 270, the component parts that comprise the complete architectural model are assembled to create the model. In this manner, a complete architectural model of a design, which includes textures and colors of at least the exterior surfaces of the model and perhaps even the interior surfaces of the model, is created.

Of course, the invention contemplates performing the above-identified steps in slightly different orders. For example, templates may be printed in groups and certain assemblies or subassemblies may be created prior to the printing of all of the templates or template texture overlays.

Figure 3:
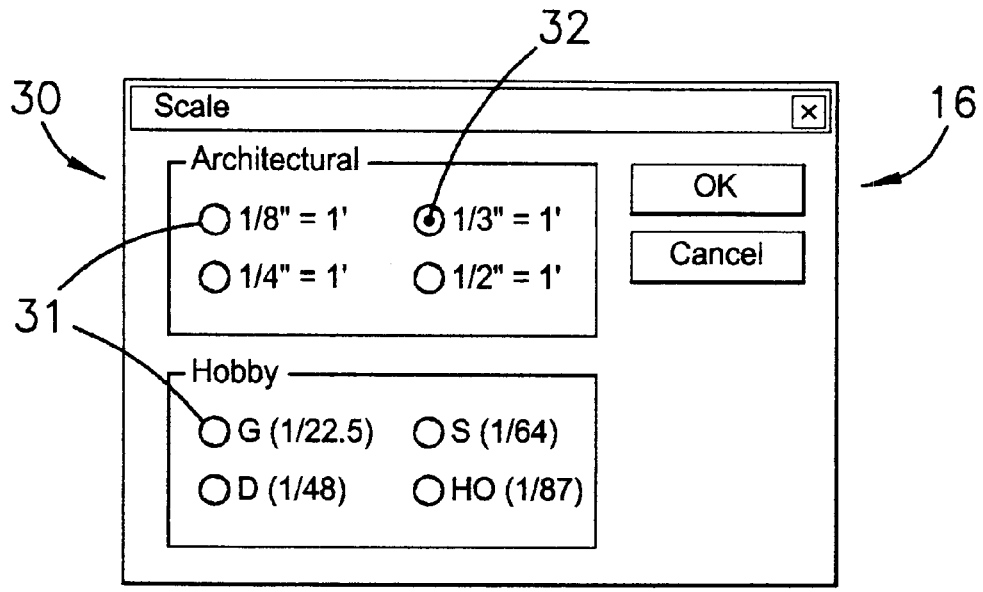
FIG. 3 is a scale dialogue box as it would appear on the computer-aided design system display, which allows a model maker to select an appropriate scale for the architectural model.

Details of the specific steps of method 200 will be explained with reference to FIGS. 3–11. Turning now to FIG. 3, a computer screen display 30 especially designed to facilitate the selection of a desired scale for the architectural model (step 215 of FIG. 2) is selected from a dialogue box displayed on the computer-aided design system display 16. The desired scale is selected by clicking on the appropriate radio button 31 shown on display 16 using an input device, such as mouse 20 (FIG. 1). In the example shown, a one-half inch equals 1 foot scale radio button 32 is selected, which would result in a 10 foot long wall printing out as a five inch wall template.

Figure 4:
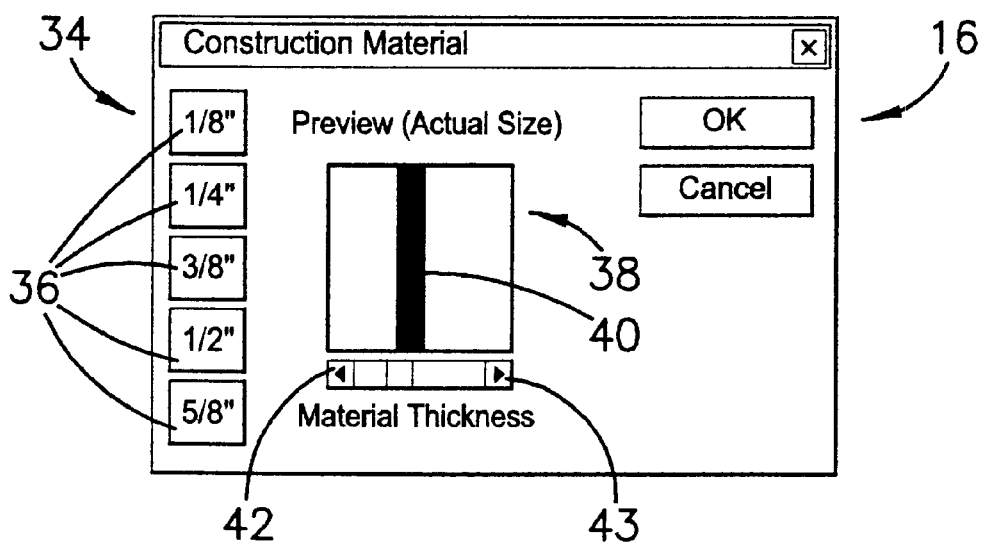
FIG. 4 is a construction material dialogue box which will allow a model maker to select a thickness for the construction material being used.

FIG. 4 shows a construction material selection dialog box 34, which is configured to facilitate the selection of the thickness of an appropriate construction material to be used to build the architectural model (step 220 of FIG. 2). The construction material selection dialog box 34 is displayed on display 16. The model maker may select from a list 36 of standard construction material thicknesses or enter a custom size in custom size window 38. In one embodiment of the invention, the construction material dialogue-box includes a measurement feature, which allows a model maker to measure the thickness of the construction material being used with a virtual gauge 40 that is displayed on the construction material dialogue box 34. The model maker would simply hold up the construction material to thickness gauge 40 and scroll right and left arrows 42 and 43, respectively, until they are aligned with the chosen construction material's dimensions.

Figure 5:
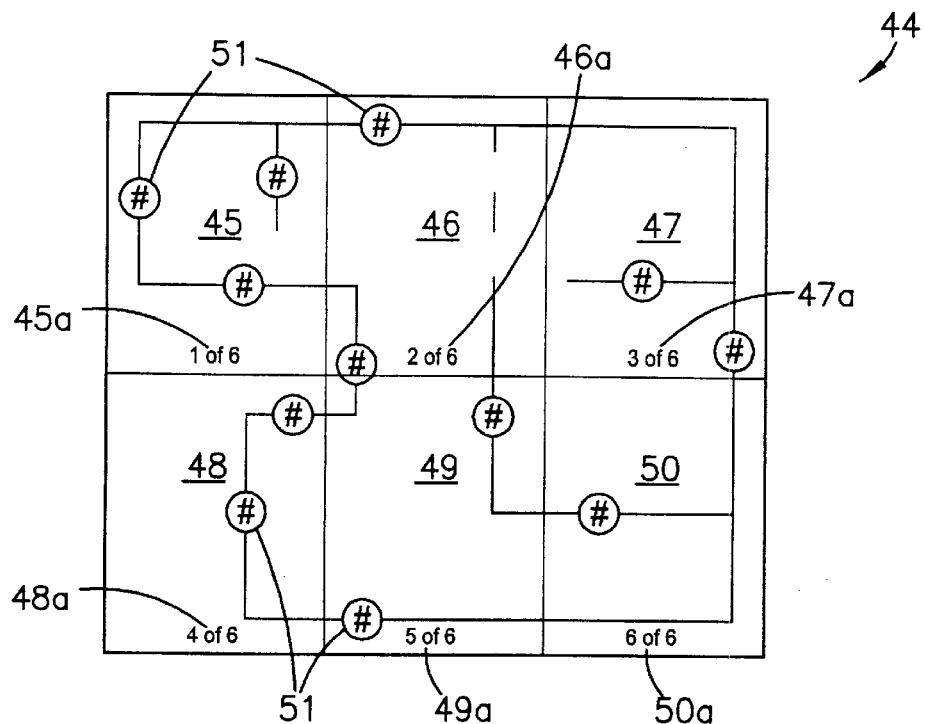
FIG. 5 is a view of six floor templates assembled together to provide a complete floor plan for an architectural model.

FIG. 5 shows, in more detail, how a floor plan is prepared according to steps 225 and 230 of FIG. 2. Depending on the selected scale for the model, it is likely that the three-dimensional architectural model being constructed will be larger in footprint than would fit a standard 8½ inch by 11 inch piece of paper. Accordingly, a typical floor plan 44 will be printed out in sections. For example, a floor plan 44 may include six sections 45–50 that will need to be pieced together to create the complete floor plan. In the preferred embodiment, directions 45a–50a for placing the floor plan sections together correctly will print out on each page. The floor plan sections are then affixed, in their proper relationship, onto a large piece of the construction material chosen (not shown) by the model maker. Preferably, a single piece of construction material is used for the floor plan to provide stability for the entire structure. Included on the floor plan are reference numbers 51, which correspond to wall placement positions. While it is unnecessary to trim around the exterior walls of the architectural design on the first floor plan, the perimeters of second and subsequent floor plans must be trimmed.

Figure 6:
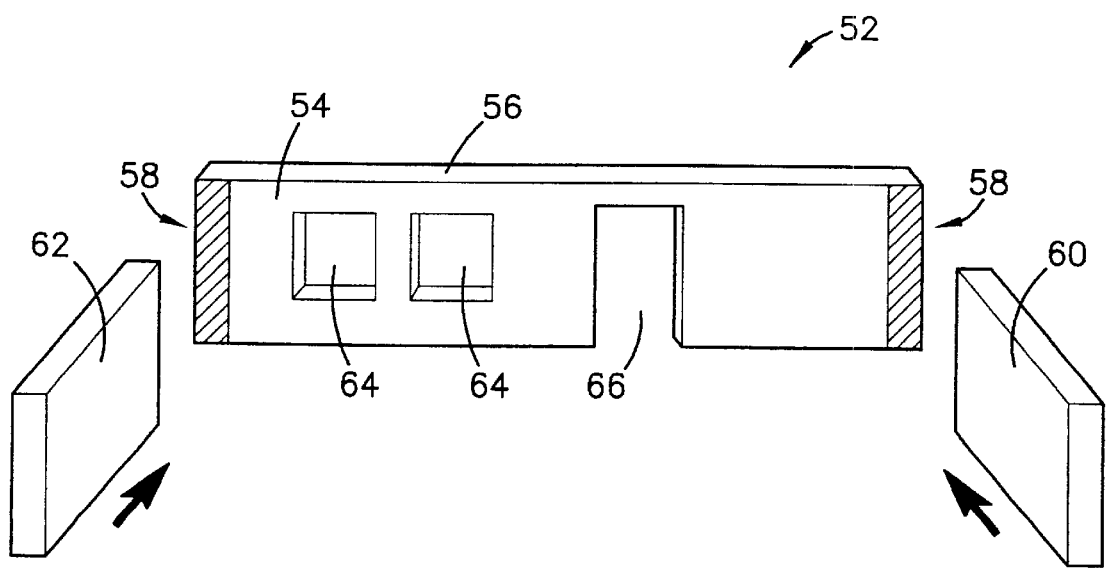
FIG. 6 is a perspective view of a wall panel template applied to the construction material showing shaded areas where additional wall panels will attach.

FIG. 6 shows how templates are used to assist in the preparation of the various components of an architectural model as well as their eventual assembly. In the example shown, a wall section 52 is prepared by affixing wall template 54 is affixed to a piece of construction material 56, such as foamboard. Wall template 54 includes shaded areas 58, which correspond to the thickness of the selected construction material and which indicate the location where additional wall sections, such as wall sections 60 and 62 will attach thereto.

Wall templates, such as template 50 will also include areas representing windows 64 and doors 66. In the example shown, the window and door areas are cut out from the construction material 52. This would allow an architect, client or other person viewing the architectural model to also view the interior of the model to see interior layouts or, in more sophisticated cases interior textures and colors of interior walls, floors and ceilings. However, as will be discussed below, for models that will include exterior renderings of windows and doors, the window and door areas would preferably be left intact.

Figure 7:
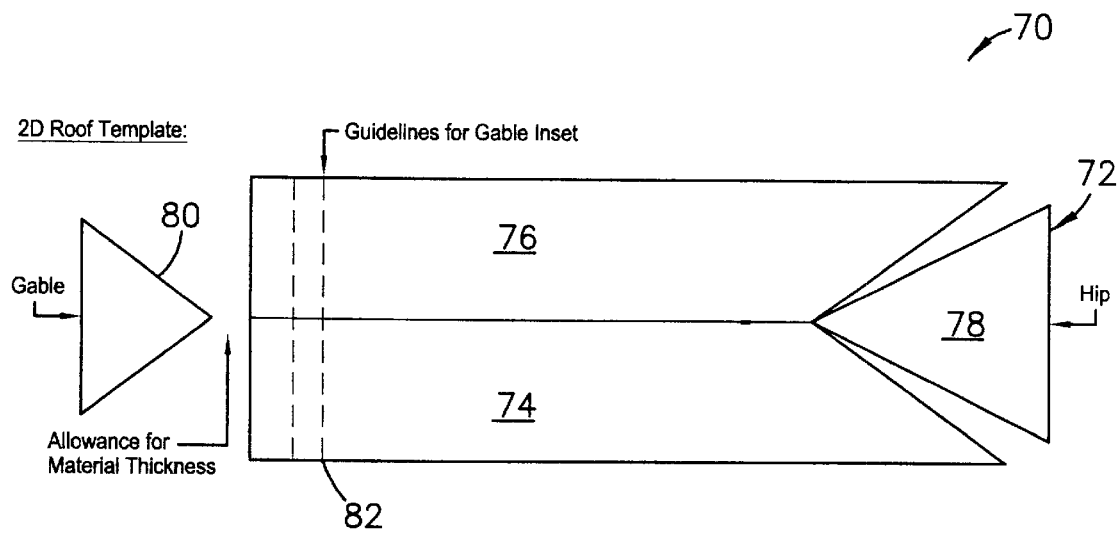
FIG. 7 is a two-dimensional roof template.

FIG. 7 show a two-dimensional roof panel template 70. The roof template 70 may include attached sections, such as the main roof surfaces 72, which include, for example, a first roof template section 74, a second roof template section 76 and a third roof template section 78, which in this example shown is a hip roof section. Additionally, individual, detached roof template sections, such as gable template section 80 may be printed out as well. In any event, each template section should be individually cut out to facilitate its use in preparing the roof panels that will be included on the 3-dimensional architectural model. Assembly guide lines, such as the guide lines for gable inset 82, may also be provided on the roof template(s) to facilitate in the assembly of the roof panels.

Figure 8:
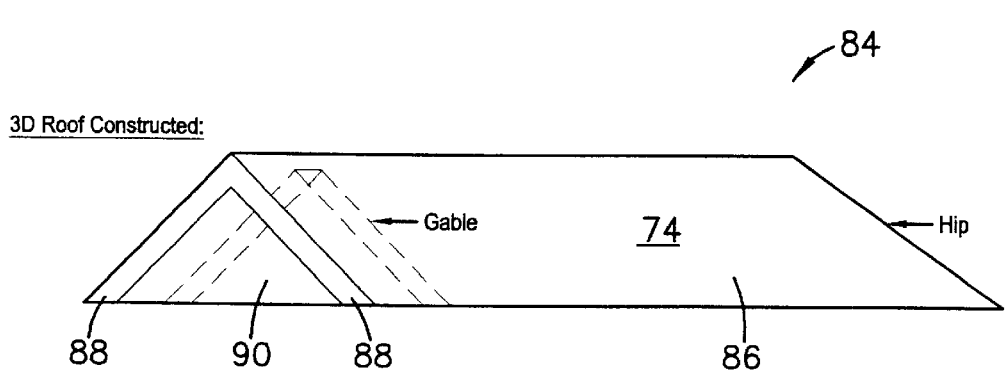
FIG. 8 is a perspective view of a three-dimensional, roof constructed from the two-dimensional roof template of FIG. 7.

FIG. 8 shows a three-dimensional roof 84 constructed according to the template design of FIG. 7. Like the method of constructing wall sections explained above, roof panels, such as first roof panel 86, are prepared by affixing a roof template section, such as first template section 74 onto a piece of construction material 88 and trimming the construction material according to the affixed template. The various roof panels, including the first, second and third roof panel sections, which correspond to the first, second and third roof template sections, as well as roof gable panel 90 are then assembled according to the template directions, including guide lines 82 (FIG. 7) to form the completed 3-dimensional roof 84. The panels are joined using well known gluing methods and techniques and may involve trimming the various panels at various angles at their edges to account for a desired roof pitch for the architectural design.

Figure 9:
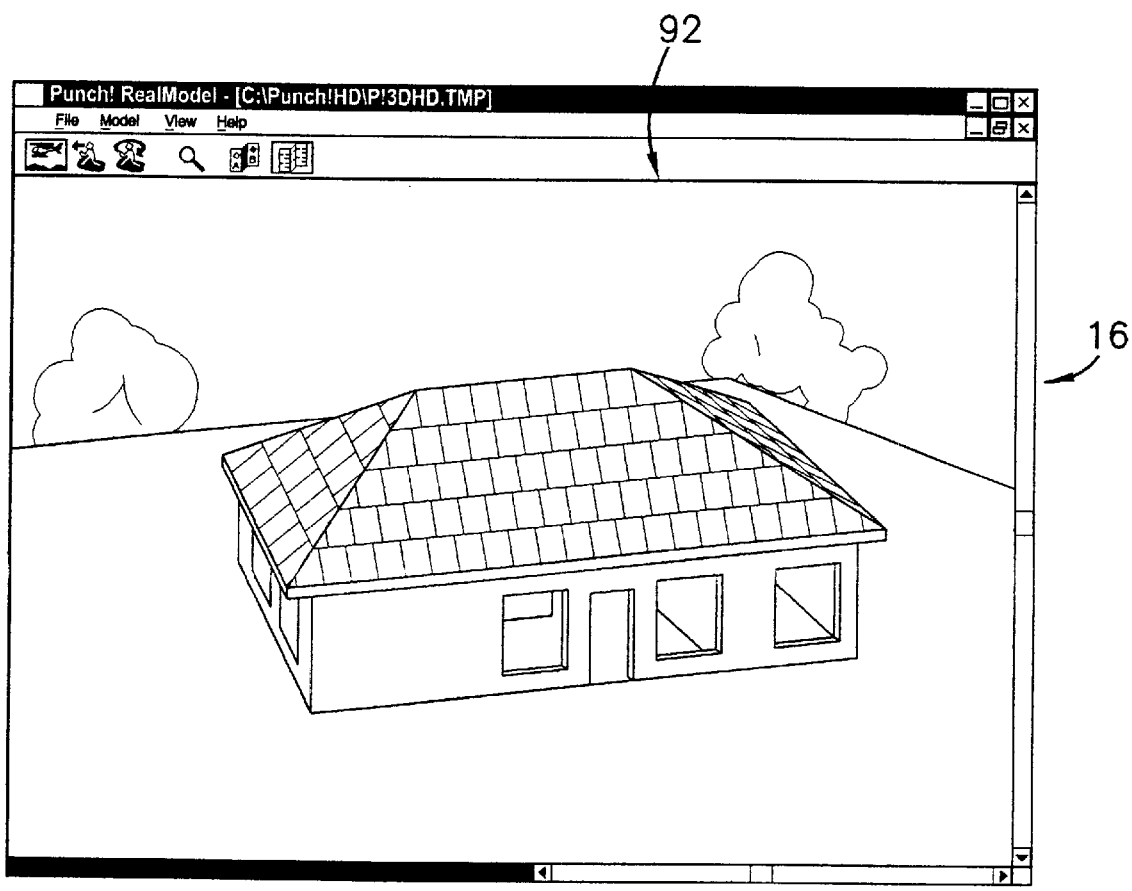
FIG. 9 is a display of the architectural design with surface textures and colors rendered thereon displayed on the computer-aided design system display.

FIG. 9 provides a computer-generated rendering 92 of an architectural design, which is displayed on a computer-aided design system display 16. The computer-generated rendering includes all of the exterior textures selected by the architect during the preparation of the architectural design.

This rendering may be used by an architect or a client in order to verify the colors and textures of the various panels of the architectural design prior to creating a model. If colors or textures are not to the liking of either the architect, the client or both, then the architect would use the computer-aided design program to manipulate the same until an acceptable colors and textures are applied to the various component parts of the design.

Figure 10:
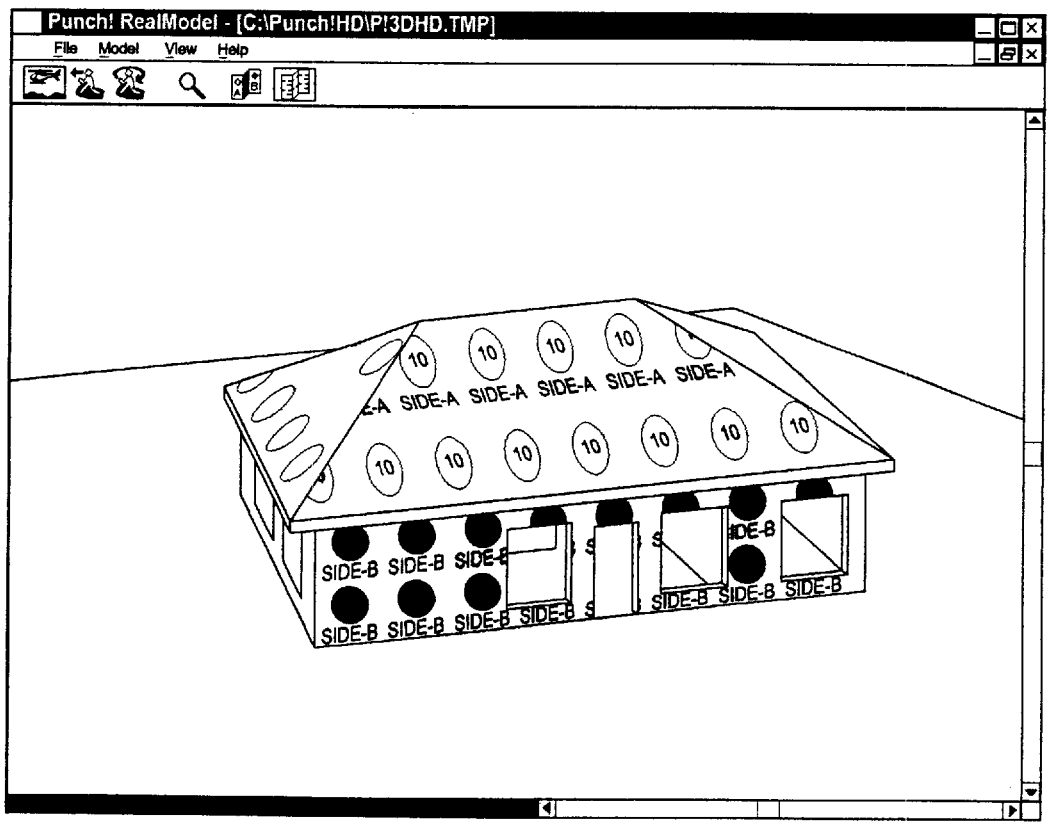
FIG. 10 is a computer-aided design system display showing a rendering of the architectural design showing the template labels, including the appropriate side thereof on the panels that comprise the three-dimensional model.

FIG. 10 shows one embodiment of the invention, wherein a template label view 93 of the architectural design is displayed on the computer-aided design system display 16. This template label view 93 provides a template label rendering 94 of the architectural design showing template labels 95, which describe the template numbers 96 and template texture sides 97 for the texture overlays that will be applied to the various model components. As explained earlier, wall templates may contain "A" sides and "B" sides, representing interior and exterior sides of each wall panel, respectively. The designer can use the template label rendering to assist him or her in affixing the appropriate template texture overlays to the appropriate side(s) of the appropriate model panels.

Figure 11:
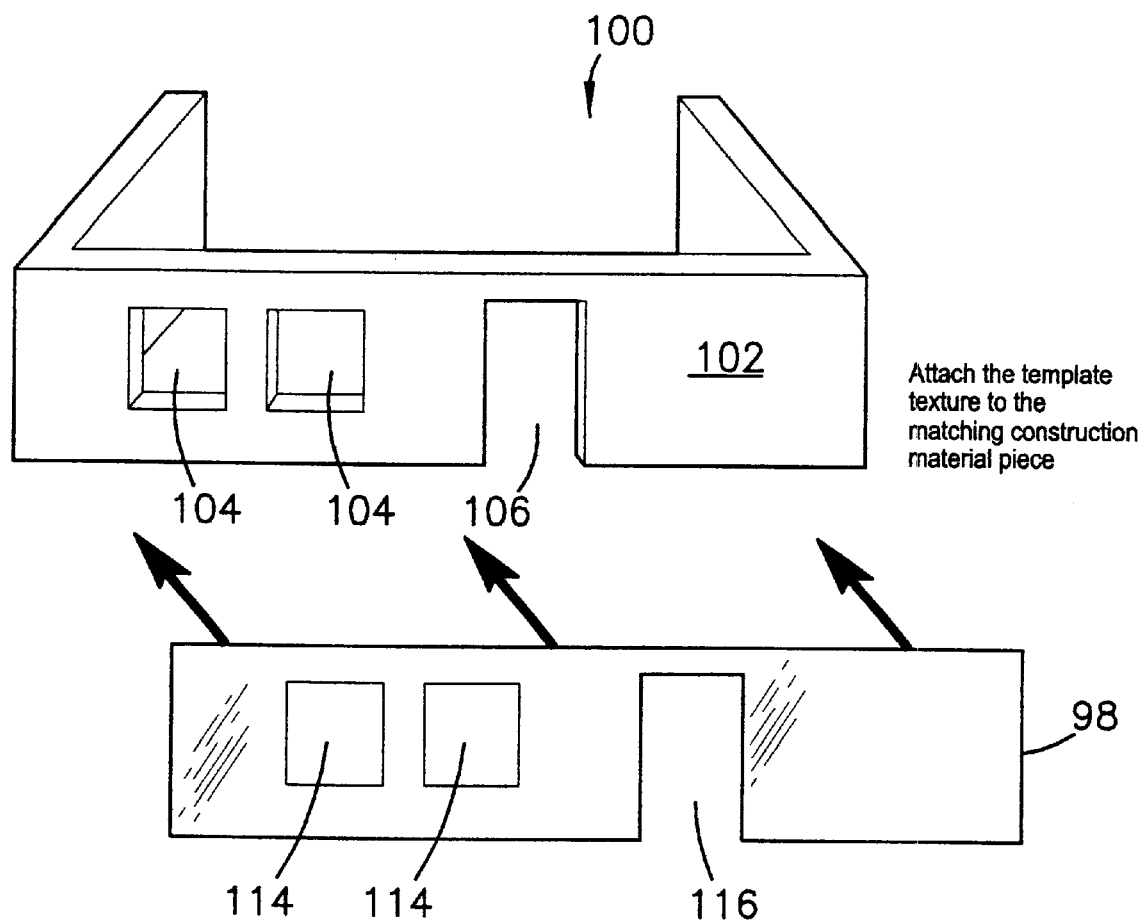
FIG. 11 is a perspective view of a template texture overlay being applied to a cut out wall panel subassembly.

FIG. 11 shows a template texture overlay, 98 being applied to one wall 102 of a constructed wall panel subassembly 100, which includes window openings 104 and door opening 106. The template texture overlay 98 also includes window openings 114 and 116, which correspond to the window and door openings found on wall 102 of the wall panel subassembly 100. As explained earlier, the template texture overlays may need to have those sections, such as window and door openings 114 and 116 removed therefrom, which would allow an architect of client to view the interior of the architectural model to inspect interior walls. In the alternative, if a specific model is constructed for the purpose of only presenting the exterior appearance of an architectural design, then the template texture overlays may include computer-generated renderings of the door and window openings in much the same manner as it would provide the textures and colors of other exterior features found on the design.

Accordingly, the disclosed invention provides a novel and effective system for preparing architectural models, which include three-dimensional, scaled surface textures and colors to provide realistic exterior and interior surfaces of the model.

Modifications and substitutions by one of ordinary skill in the art are considered to be within the scope of the present invention which is not to be limited except by the claims which follow.

What is claimed is:

1. A method of creating an architectural model comprising the steps of:

providing a computer-aided design system including a processor, at least one input device, a visual display device and an output printer for generating a complete architectural design, including a plurality of scaled surface textures of said architectural design;

printing scaled templates for a plurality of component parts of said architectural design including building instructions for said model using said printer;

affixing said scaled templates to a model construction material and trimming said material according to the scaled templates to create said component parts;

printing scaled texture overlays, which are separate from said templates, corresponding to said surface textures and affixing said overlays to said component parts, which have been trimmed; and assembling said component parts according to said building instructions.

2. The method as claimed in claim 1, wherein said step of printing scaled templates for component parts of said design comprises printing scaled templates for walls and roofs.

3. The method as claimed in claim 1, wherein said step of printing scaled templates further comprises printing scaled templates for floors.

4. The method as claimed in claim 1, wherein said step of printing scaled templates includes printing labels on said scaled templates, said labels corresponding to said scaled texture overlays.

5. The method as claimed in claim 1 wherein said step of printing said scaled texture overlays further comprises leaving void regions on said overlays representing windows and doors.

6. The method as claimed in claim 1, wherein said step of printing said scaled texture overlays comprises printing windows and doors onto said scaled texture overlays.

7. The method as claimed in claim 1, further comprising the step of inputting a thickness dimension of said model construction material and automatically adjusting said scaled templates to account for said thickness dimension.

8. The method as claimed in claim 1, wherein said step of printing said scaled templates includes indicating on said scaled templates regions where said component parts will join other component parts.

9. The method as claimed in claim 1, wherein said step of printing said scaled texture overlays and affixing said scaled texture overlays to said construction material component parts comprises affixing scaled texture overlays to interior and exterior sides of said component parts.

10. The method as claimed in claim 1, wherein said steps of affixing said templates and texture overlays comprises gluing said templates and overlays onto said construction material.

11. A method of creating an architectural model comprising the steps of:

providing a computer-aided design system including a processor, at least one input device, a visual display device and an output printer for generating a complete architectural design;

printing scaled templates for a plurality of component parts of said architectural design using said printer;

printing on each template indicia representative of where an adjacent component part should be affixed;

affixing said scaled templates to a model construction material and trimming said material according to the scaled templates to create said component parts;

assembling said component parts according to the indicia;

printing scaled texture overlays, which are separate from said templates, corresponding to said surface textures; and affixing said overlays to said component parts, which have been trimmed, so as to cover the indicia on the templates.

* * * * *